Feb. 28, 1939.   R. J. RIDGE   2,148,643
REFRIGERATOR CONTROL
Filed Aug. 19, 1937   2 Sheets-Sheet 1
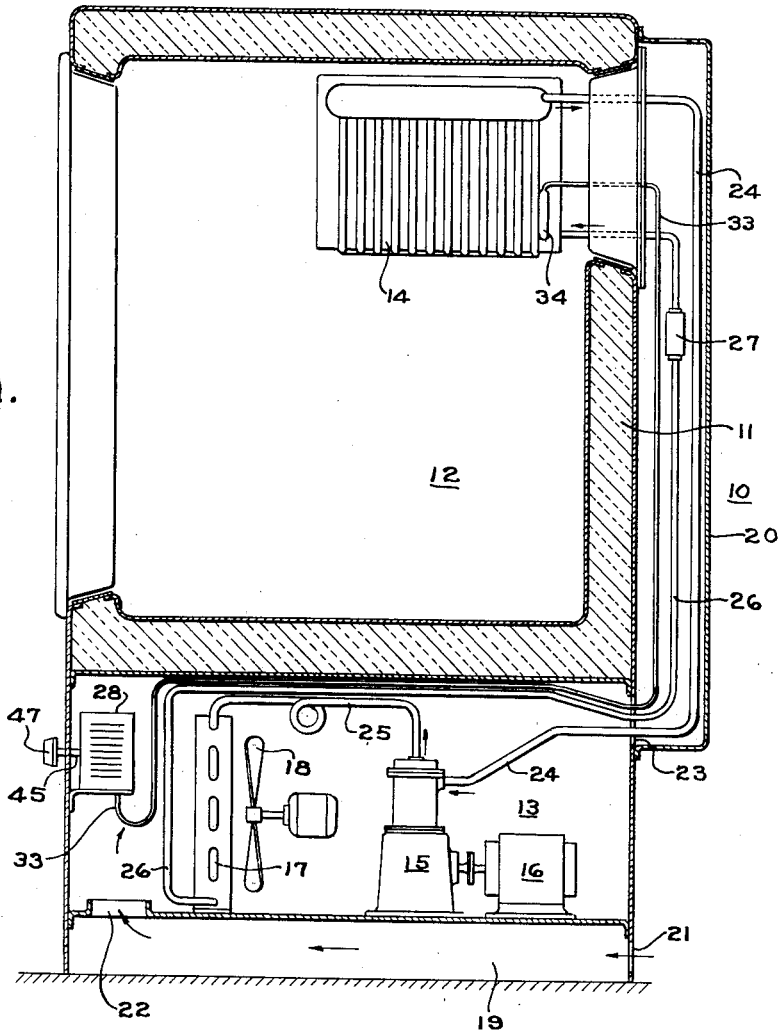
FIG.1.
FIG.4.
WITNESSES:
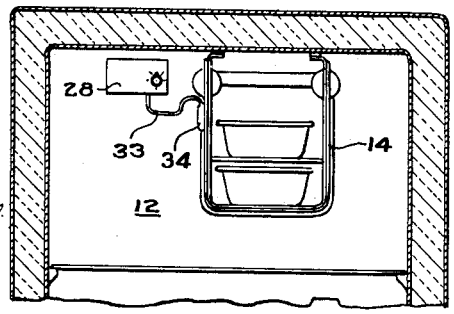
INVENTOR
RAYMOND J. RIDGE.
BY
ATTORNEY Feb. 28, 1939.  R. J. RIDGE  2,148,643
REFRIGERATOR CONTROL
Filed Aug. 19, 1937  2 Sheets-Sheet 2

WITNESSES:

INVENTOR
RAYMOND J. RIDGE.
BY
ATTORNEY

Patented Feb. 28, 1939

2,148,643

UNITED STATES PATENT OFFICE 2,148,643

REFRIGERATOR CONTROL

Raymond J. Ridge, Yeadon, Pa., assignor to Westinghouse Electric & Manufacturing Company, East Pittsburgh, Pa., a corporation of Pennsylvania Application August 19, 1937, Serial No. 159,822

9 Claims. (Cl. 62—4)

My invention relates to refrigerating apparatus and has for an object to provide an improved temperature control therefor.

A further object of the invention is to provide an improved refrigerator control which has provisions for varying the temperature of the cooling element inversely with changes in temperature in a region remote from said element, so that the temperature of the zone to be cooled is maintained at a substantially constant predetermined mean value.

Another object of the invention is to provide an improved control mechanism for a refrigerating machine which has provisions for adjusting the temperature of the refrigerating element in response to changes in temperature exteriorly of the zone cooled thereby, said mechanism being so constructed and arranged that it may be disposed in a stream of air for cooling a heat dissipating element of the refrigerator.

A still further object of the invention is to provide a novel organization of the elements of a temperature-responsive switch in which the connection between the thermal responsive element and the contact operating mechanism is adjusted in response to the temperature of the ambient atmosphere.

These and other objects are effected by my invention as will be apparent from the following description and claims taken in connection with the accompanying drawings, forming a part of this application, in which:

Fig. 1 is a sectional view of a refrigerator controlled in accordance with my invention;

Fig. 4 shows a modified arrangement of my improved control apparatus when applied to a refrigerator of the type shown in Fig. 1.

Figure 3:
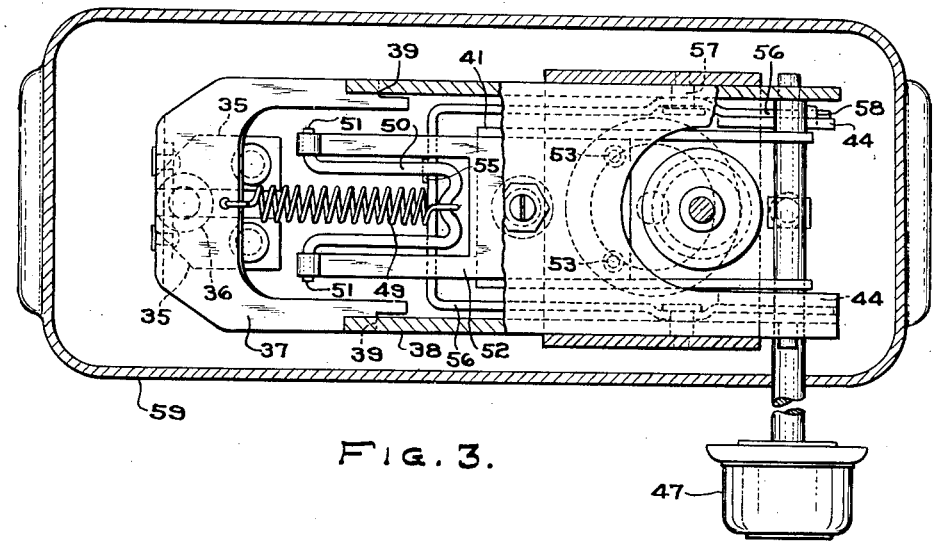
Fig. 3 is a sectional view taken on the line III—III of Fig. 2.

My invention is applicable to the control of various forms of refrigerators, but I have chosen to show it by way of example as applied to a domestic refrigerator, generally indicated at 10, and including a heat insulated cabinet structure 11. A refrigerated food storage compartment 12 and a machinery compartment 13 are formed in the cabinet 11, the former being refrigerated by a suitable evaporator 14. A refrigerant condensing unit, shown by way of example, of the compressor type, is disposed in the machinery compartment 13 and includes a compressor 15, driven by a motor 16, and a condenser 17, the latter being cooled by a fan 18.

An air duct 19 is formed within the compartment 13 and has inlet and outlet openings 21 and 22 communicating with the ambient atmosphere and the compartment 13, respectively. Air translated by the fan 18 enters the duct 19 through the opening 21 and passes through the opening 22 to the compartment 13 and thence to the ambient atmosphere through a discharge opening 23 in the rear wall of the compartment 13. A flue 20 may be provided for conveying the warm air to adjacent the top of the cabinet. During inactive periods of the fan 18, circulation of air through the compartment 13 continues at a reduced rate due to the chimney effect of the flue 20. Heat is abstracted from the condenser 17, the compressor 15 and motor 16 by the air as it traverses the compartment 13.

Refrigerant vaporized in the evaporator 14 is withdrawn by the compressor 15 through a suction conduit 24 and is compressed to a relatively high pressure. The compressed vapor passes through a conduit 25 to the condenser 17 in which it is cooled and condensed by the air translated by the fan 18. The liquid refrigerant passes from the condenser 17 through a conduit 26 to a suitable expansion device 27 and thence to the evaporator 14 for vaporization. The expansion device 27 may be of any well known type and functions to reduce the pressure of the liquid refrigerant to the relatively low value maintained in the evaporator by the compressor 15. As will be apparent to those skilled in the art, the system described operates on the well known compressor-condenser-expander cycle and no further description of the same is deemed necessary.

Operation of the compressor is controlled by a temperature responsive mechanism 28 constructed in accordance with my invention and preferably subjected to the ambient or room temperature. As shown, the mechanism 28 is disposed in the stream of cooling air entering the compartment 13 where it responds quickly to changes in temperature of the ambient air. Further reference to this responsive action will be made hereinafter.

Figure 2:
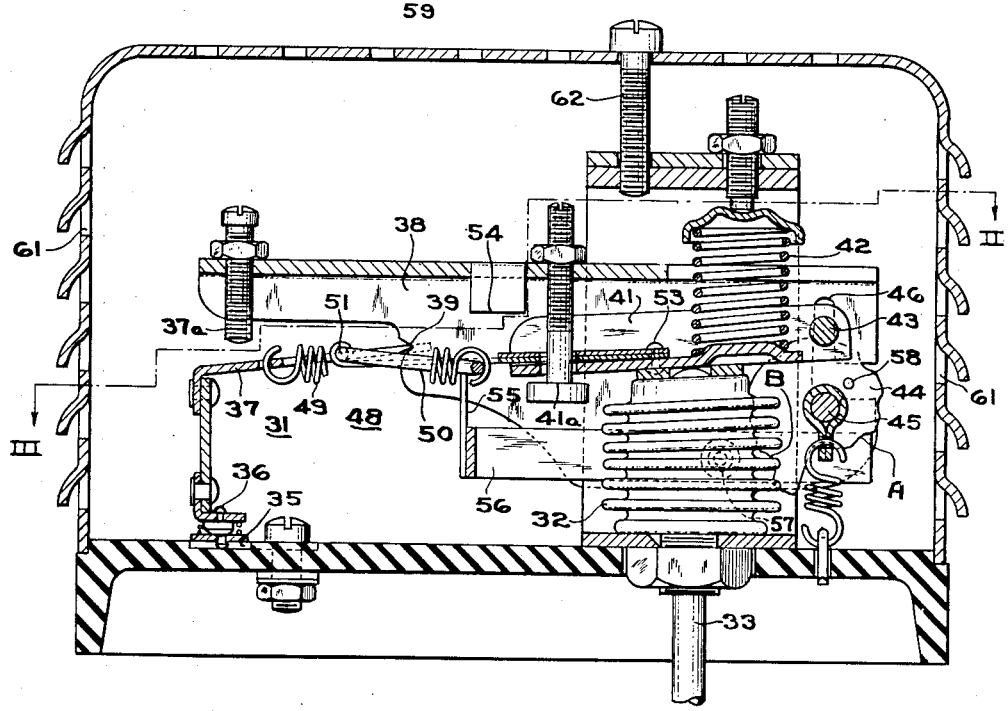
Fig. 2 is a vertical sectional view of the control mechanism shown in Fig. 1.

The control mechanism 28 is shown in detail in Figs. 2 and 3, and is very similar to the control mechanism shown in the Aalborg Patent 2,039,376, issued May 5, 1936, but is modified in accordance with my invention so that it responds to changes in temperature of the ambient atmosphere. It will be understood that my invention may be applied to other types of thermally actuated switch structures and that the showing in the present application represents but one of many forms of switch structure which may be constructed in accordance with my invention.

The control mechanism 28 functions to start and stop operation of the motor 16 and compressor 15 in response to predetermined high and low temperatures of the evaporator 14. As the leakage of heat from the ambient atmosphere to the refrigerated zone 12 varies with different temperatures thereof, the control mechanism is provided with improved means for varying the mean controlled temperature of the evaporator 14 inversely with rise or fall in ambient temperature.

The control mechanism 28 includes a switch structure 31 and embodies a stationary contact 35 and a movable contact 36 connected by conductors (not shown) in the circuit of the motor 16 which effect energization of the motor 16 when closed. The switch structure 31 is actuated by a thermal responsive element including an expansible bellows 32 connected by a tube 33 to a bulb or reservoir 34 that contains a volatile fluid, the pressure of which varies with its temperature. Accordingly, the bellows expands with an increased temperature of the bulb 34 to close the contacts 35 and 36 and contracts as the temperature of the bulb 34 is decreased to open the contacts 35 and 36. The bulb 34 is disposed in heat transfer relation with the evaporator 14 and its temperature closely follows the temperature of the evaporator.

The switch structure 31 includes the stationary contacts 35 which are bridged in the closed switch position by the movable contact 36, the latter being carried by an insulated contact carrying member 37. The member 37 is pivoted in a frame structure 38, knife-edge bearings being provided therein as shown at 39. A stop 37a is provided for limiting upward movement of the member 37 and is preferably threaded into the frame 38 so it is adjustable.

Movement of the bellows 32 is imparted to a movable lever 41 that is biased against the force of the bellows 32 by a spring 42. The spring bias is readily adjustable, whereby the temperature of the evaporator at which the compressor is started and stopped may be varied at the will of the operator. The lever 41 is movable between stops, one of which is defined by the frame 38 and the other of which is shown at 41a. The lever 41 carries a pivot 43 that is supported by cams 44, the latter being carried by a shaft 45 journaled in the frame 38. A pair of slots 46 are provided in the frame 38 for receiving the pivot 43 and provide for vertical movement of the pivot 43 as the cam 44 is rotated from one position to another. Movement of the cam 44 may be effected manually at will by a knob or handle 47 secured to the shaft 45 and disposed exteriorly of the compartment 13 as shown in Fig. 1. Movement of the cams 44 varies the force which the bellows 32 must exert to open and close the switch mechanism 31, thus varying the mean temperatures of the evaporator 14.

Opening and closing movement of the switch structure 31 is effected by a snap acting mechanism 48 actuated by the lever 41. The mechanism 48 includes a tension spring 49 having one of its ends secured to the contact carrying member 37 and its other end to the mid-section of a U-shaped arm or bail 50. The legs of the bail 50 provide pivots 51 which are moved upwardly and downwardly with the lever 41. The snap-acting mechanism 48 provides the connection between the lever 41 and switch structure 31. The control mechanism thus far described is substantially the same as that disclosed in the aforesaid Aalborg patent.

In accordance with my invention, however, a thermal responsive element 52 has one of its ends secured to the lever 41, as shown at 53, and the other end thereof supports the pivots 51 of the bail. The element 52 is subjected to ambient temperature and is so constructed that it flexes or bows with changes in the ambient temperature. A rise in ambient temperature causes the element to flex so that the pivots 51 are raised and, conversely, a drop in ambient temperature lowers the pivots 51. Accordingly, the relation between the lever 41 and the snap-acting mechanism 48 of the switch 31 is varied with changes in ambient temperature and, therefore, the temperatures of the bulb 34 at which the switch 31 is opened and closed are varied. Further reference to this operation will be made hereinafter.

Movement of the bail 50 is limited in both directions of its movement by stops 54 and 55, the latter of which is carried by a lever 56 pivoted to the frame 38 as shown at 57 and normally disposed in the position shown in the drawings. The lever 56 is actuated in clockwise direction by a pin 58 carried by one of the cams 44. The pin 58 engages the lever 56 and moves it about the pivot 57 when the cam 44 is moved to the position wherein the portion of the cam of greatest radius engages the lever pivot 43. In this position of the cam, the switch 31 is maintained open regardless of the temperature of the evaporator. Further reference to this switch operation is made hereinafter.

A cover 59 may be provided for the control mechanism and contains a plurality of openings 61 for the passage of air from the ambient atmosphere. The cover 59 is secured in place in any suitable manner such as, for example, by a screw 62 threaded in the frame structure 38.

*Operation*

As shown in Fig. 3, the cam 44 is adjusted to an intermediate position wherein the switch 31 is opened and closed at predetermined temperatures of the evaporator 14 such as, for example, 18° F. and 28° F., respectively, for a given temperature of the ambient atmosphere. The switch 31 is shown closed so that the motor 16 is energized and the compressor 15 is operating to circulate refrigerant through the evaporator 14 for cooling the same.

As the temperature of the evaporator 14 is depressed, the bellows 32 is contracted and the lever 41 moves in counterclockwise direction. When the temperature of the evaporator 14 is depressed to 18° F., the center of the pivots 51 of the bail 50 passes beneath the center of the spring 49 so that the bail is moved upwardly about the pivots 51 by the spring 49 until the bail 50 engages the stop 54. During this upward movement of the bail 50, the center of the spring 49 passes above the knife-edge bearings 39 and, therefore, the contact carrying arm 37 is moved upwardly into engagement with the stop 37a, thus opening the contacts 35, 36 and opening the circuit of the motor 16 to terminate circulation of refrigerant by the compressor 15.

During the inactive period of the compressor 15, the temperature of the evaporator 14 rises and the bellows 32 is expanded. The pivots 51 of the bail 50 are elevated and, as they pass above the center of the spring 49, the latter swings the bail 50 downwardly into engagement with the stop 55. During this movement, the center of the spring 49 passes the center of the knife-edge bearings 39 so that the contact carrying member 37 is moved downwardly by the spring to close the contacts 35, 36. Operation of the compressor 15 is then initiated and refrigerant is circulated through the evaporator 14. A complete cycle of operation of the switch 31 for a constant ambient temperature has now been completed.

Assume now that the ambient temperature rises. Air at increased temperature is now entering the air duct 19 and 22 and contacts with the thermal responsive element 52, entering the control casing 59 through slots 61. The thermal responsive element 52 reflects this change and is bowed so that the pivots 51 of the bail move upwardly. Accordingly, the bellows 32 will open and close the switch 31 at reduced amplitudes to lower the mean evaporator temperature. As the heat leakage into the zone 12 increases with increased ambient temperatures, the reduced evaporator temperature compensates for this increase in heat load and the temperature of the air in the zone 12 is maintained at a substantially constant value.

As stated heretofore, the operator may increase or decrease the temperature maintained in the zone 12 by adjusting the cam 44. Movement of the cam clockwise, as viewed in Fig. 3, raises the pivot 43 and, therefore, the bellows 32 opens and closes the switch 31 at increased amplitudes and increased evaporator temperatures. Counterclockwise rotation of the cam lowers the pivot 43 so that operation of the switch is effective at reduced amplitudes of the bellows and reduced evaporator temperatures. It will be understood that the element 52 adjusts the control mechanism in the various positions of the cam in response to outside temperature.

A position wherein operation of the compressor is continuous may be provided by so forming the cam that the pivot 43 is lowered to a position wherein opening of the switch cannot be effected. This operation is effected when the position of the cam 44 indicated at A engages the pivot 43. In this position, the lever 41 engages the stop 41a and downward movement of the lever 41 is arrested before the pivots 51 are lowered sufficiently to effect operation of the snap-acting mechanism 48 in switch opening direction. The mechanism may be so adjusted that, in this continuous running position, the element 52 cannot deflect sufficiently in normally expected ambient temperatures to effect opening of the switch.

An "off" position is provided wherein the compressor motor is rendered inactive by the control mechanism, the means for effecting this operation including the pivoted lever 56 and pin 58. In the "off" position, the portion B of the cam 44 engages the pivot 43 so that the latter is in its highest position and the pin 58 is in engagement with the lever 55. The stop 55 is moved upwardly by the tilted lever 56 and the bail 50 is held in engagement with the upper stop 54. Accordingly, in this position, the switch 31 is maintained open as the snap-acting mechanism is rendered ineffective to close the contacts. Upward movement of the main lever 41 is arrested in this position by the frame 38. It will be obvious that the thermal responsive element 55 is ineffective in this position to control the operation of the switch mechanism 31 regardless of ambient temperatures.

From the foregoing, it will be apparent that I have provided an improved control mechanism that quickly responds to variations in the ambient temperature for maintaining the temperatures in a refrigerated zone at a substantially constant value. The element responsive to the ambient temperature is interposed between the switch mechanism and its thermal responsive actuator whereby a relatively small element may be employed as the force to be overcome during an adjustment is at a minimum in this location.

The invention is particularly adaptable to a switch structure having a snap-acting mechanism of the type shown, but it will be understood that it may be applied to other forms of switch structures.

While I have shown the control mechanism 28 in the cooling air stream for the heat dissipating elements of a refrigerator wherein a circulation of ambient air through the control is continually obtained, it will be understood that it may be disposed otherwise in the ambient atmosphere or may be disposed in the refrigerated zone 12 as shown in Fig. 4. In the latter case, the thermal responsive element 52 responds to the temperature of the air in the zone 12 for adjusting the evaporator temperature. It will be understood that a change in ambient temperature effects a change in the temperature of the air in the zone 12 due to the increase or decrease in heat flow through the walls defining the zone and, therefore, the element 52 is indirectly responsive to changes in ambient temperature in this position.

When the control mechanism is disposed within the refrigerated zone 12, a small change in the temperature of the air in the zone is necessary in order to effect adjustment of the control by the element 52. Accordingly, the temperature of the air in the zone 12 is not maintained constant, but it is maintained substantially constant and within predetermined limits. When the control is disposed within the refrigerated zone, the element 52 should be of relatively high sensitivity in order that it may quickly reflect variations in temperature and arrest the variations before they become of high value. An advantage of locating the control mechanism in the refrigerated zone is that it responds to load changes due to servicing the cabinet with foodstuffs and the like.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In refrigerating apparatus, the combination of means defining a zone to be refrigerated, a refrigerating machine including an evaporator for abstracting heat from said zone, a switch mechanism for controlling the operation of the refrigerating machine, a thermal responsive element movable in response to the temperature of said evaporator, a lever having a pivot and actuated by the thermal responsive element, means biasing the lever in opposition to said element, means connecting said lever and said switch mechanism for imparting movement of the former to the latter, means manually operated at will for adjusting said pivot whereby the temperature of the evaporator is varied, and means responsive to the temperature of the atmosphere exteriorly of said zone for adjusting said connecting means relative to said lever whereby the temperature of the evaporator is varied inversely with changes in the temperature of the air exteriorly of the zone.

2. In refrigerating apparatus, the combination of means defining a zone to be refrigerated, a refrigerating machine including an evaporator for abstracting heat from said zone, a switch for controlling the operation of the refrigerating machine, an expansible bellows movable in response to the temperature of the evaporator, a lever including a pivot about which it swings, said lever being actuated by said bellows, means manually operated at will for adjusting said pivot relative to the bellows, a spring biasing said lever in opposition to the bellows, a thermal responsive element carried by said lever and movable in response to the temperature of the air exteriorly of said zone, a toggle arm pivoted to said thermal responsive element, a pair of stops for limiting movement of the toggle arm, and a tension spring connecting the toggle arm and the switch for imparting movement to the switch in a snap-acting manner.

3. In refrigerating apparatus, the combination of a cabinet structure defining an insulated chamber to be refrigerated and a machinery compartment, an evaporator for abstracting heat from said insulated chamber, a refrigerating machine disposed within the machinery compartment for circulating refrigerant through the evaporator and including a heat dissipating element, means for conveying cooling air from the ambient atmosphere through the machinery compartment and in heat transfer relation with the heat dissipating element, and a control mechanism disposed in the path of the cooling air and including means responsive to the temperature within said refrigerated chamber and a switch actuated thereby for controlling the operation of said refrigerating machine, said control mechanism including a thermal responsive element subjected to the cooling air for adjusting the switch relative to said temperature responsive means.

4. In refrigerating apparatus, the combination of a cabinet structure defining an insulated chamber to be refrigerated and a machinery compartment, an evaporator for abstracting heat from said insulated chamber, a refrigerating machine disposed within the machinery compartment for circulating refrigerant through the evaporator and including a heat dissipating element, means for conveying cooling air from the ambient atmosphere through the machinery compartment and in heat transfer relation with the heat dissipating element, and a control mechanism disposed in the path of the cooling air entering the machinery compartment; said control mechanism including a switch for controlling the operation of said refrigerating machine, means movable in response to the temperature of said evaporator for actuating the switch and a thermal responsive element interposed between said temperature responsive means and the switch for varying the temperatures of said evaporator at which the switch is operated inversely with changes in temperature of the ambient atmosphere.

5. The combination as claimed in claim 4 including means accessible exteriorly of the machinery compartment for manually adjusting at will the temperatures of the evaporator at which the switch is operated.

6. In refrigerating apparatus, the combination of a cabinet structure defining an insulated chamber to be refrigerated and a machinery compartment, an evaporator for abstracting heat from said chamber, a compressor disposed in said machinery compartment for withdrawing vaporous refrigerant from the evaporator, a condenser disposed adjacent the compressor for condensing the withdrawn refrigerant vapor, a fan for translating air from the ambient atmosphere in heat transfer relation with said condenser and a control mechanism disposed in the translated stream of air and within said machinery compartment; said control mechanism including an element movable in response to the temperature within said refrigerated chamber, a switch for controlling operation of the compressor and actuated by said element, a thermal responsive device connecting said element and said switch and movable in response to changes in the temperature of the ambient atmosphere and means for manually adjusting the control mechanism for selecting the temperature to be maintained in the refrigerated chamber, said last-named means having a readily accessible handle disposed exterior of the machinery compartment.

7. In refrigerating apparatus, the combination of a cabinet structure defining an insulated chamber to be refrigerated and a machinery compartment, an evaporator for abstracting heat from said insulated chamber, a refrigerating machine disposed within the machinery compartment for circulating refrigerant through the evaporator and including a heat dissipating element, means for conveying cooling air from the ambient atmosphere through the machinery compartment and in heat transfer relation with the heat dissipating element, and a mechanism for controlling the operation of the refrigerating machine in response to the temperature of the evaporator and including an element responsive to the temperature of the cooling air conveyed through the machinery compartment for modifying the operation of the control mechanism.

8. In refrigerating apparatus, the combination of a cabinet structure defining an insulated chamber to be refrigerated and a machinery compartment, an evaporator for abstracting heat from said insulated chamber, a refrigerating machine disposed within the machinery compartment for circulating refrigerant through the evaporator, a heat dissipating element, means for conveying cooling air from the ambient atmosphere in heat transfer relation with the heat dissipating element, and a mechanism for controlling the operation of the refrigerating machine in response to the temperature of the evaporator and including a device disposed in contact with the stream of cooling air conveyed from the ambient atmosphere to the heat dissipating element and responsive to the temperature thereof for modifying the operation of the control mechanism.

9. In refrigerating apparatus, the combination of means defining an insulated chamber to be refrigerated, refrigerating means including a cooling element for abstracting heat from the media in the insulated chamber and a heat dissipating element disposed exteriorly of said chamber, means for conveying a stream of air from the ambient atmosphere in heat transfer relation with said heat dissipating element, and a mechanism for controlling the operation of the refrigerating means in response to the temperature of said cooling element, said mechanism including a device disposed in heat transfer relation with said stream of air for modifying the operation of the control mechanism.

RAYMOND J. RIDGE.